(12) United States Patent
Morr et al.

(10) Patent No.: US 12,224,567 B2
(45) Date of Patent: Feb. 11, 2025

(54) ELECTRICAL BOX

(71) Applicant: ALLIED MOULDED PRODUCTS, INC., Bryan, OH (US)

(72) Inventors: Dustin Morr, Edon, OH (US); Aaron Herman, Bryan, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 0 days.

(21) Appl. No.: 18/798,036

(22) Filed: Aug. 8, 2024

(65) Prior Publication Data

US 2025/0015575 A1 Jan. 9, 2025

Related U.S. Application Data

(63) Continuation of application No. 18/658,121, filed on May 8, 2024.

(60) Provisional application No. 63/511,954, filed on Jul. 5, 2023.

(51) Int. Cl.
*H02G 3/08* (2006.01)

(52) U.S. Cl.
CPC .................................. *H02G 3/085* (2013.01)

(58) Field of Classification Search
CPC .......... H02G 3/08; H02G 3/081; H02G 3/085; H02G 3/083; H02G 3/32; H02G 3/065; H02G 15/00; H02G 15/007; H05K 5/00; H05K 5/02; H05K 5/0217; H05K 5/0247
USPC ..... 174/50, 666, 40 CC, 652, 654, 655, 660, 174/661, 64, 60; 220/3.2, 3.3, 4.02; 248/49, 74.2, 74.1, 68.1
See application file for complete search history.

(56) References Cited

U.S. PATENT DOCUMENTS

| | | | | |
|---|---|---|---|---|
| 4,082,915 A | * | 4/1978 | Silver | H02G 3/083 174/665 |
| 4,277,641 A | * | 7/1981 | Bauer | H02G 3/083 174/661 |
| 4,306,109 A | * | 12/1981 | Nattel | H02G 3/083 174/665 |
| 4,316,999 A | * | 2/1982 | Nattel | H02G 3/085 174/661 |
| 4,591,658 A | * | 5/1986 | Bauer | H02G 3/065 174/661 |
| 4,605,816 A | * | 8/1986 | Jorgensen | H02G 3/083 174/661 |
| 4,724,282 A | | 2/1988 | Troder | |
| 6,064,009 A | * | 5/2000 | Jorgensen | H02G 15/013 174/40 CC |

(Continued)

*Primary Examiner* — Angel R Estrada
(74) *Attorney, Agent, or Firm* — Shumaker, Loop & Kendrick, LLP

(57) ABSTRACT

An electrical box includes an enclosure having a bottom wall and a peripheral wall extending away from the bottom wall in an axial direction of the enclosure to define a cavity of the enclosure with a front opening of the enclosure providing access to the cavity thereof. A retainer wall extends axially from the bottom wall and is spaced from the peripheral wall with respect to an inward direction of the enclosure arranged transverse to the axial direction thereof. A clamping element is positioned and maintained in a clamp opening formed between the peripheral wall and the retainer wall by a press fit with the clamping element applying a clamping force to an electrical cable extending through a gap formed between the peripheral wall and the clamping element.

18 Claims, 7 Drawing Sheets

(56) References Cited

U.S. PATENT DOCUMENTS

| | | | | |
|---|---|---|---|---|
| 6,232,553 B1 * | 5/2001 | Regen | ................... | H02G 3/083 |
| | | | | 174/64 |
| 6,423,897 B1 * | 7/2002 | Roesch | ................. | H02G 3/086 |
| | | | | 174/53 |
| 6,657,125 B1 * | 12/2003 | Thompson | ............... | H02G 3/32 |
| | | | | 174/53 |

* cited by examiner

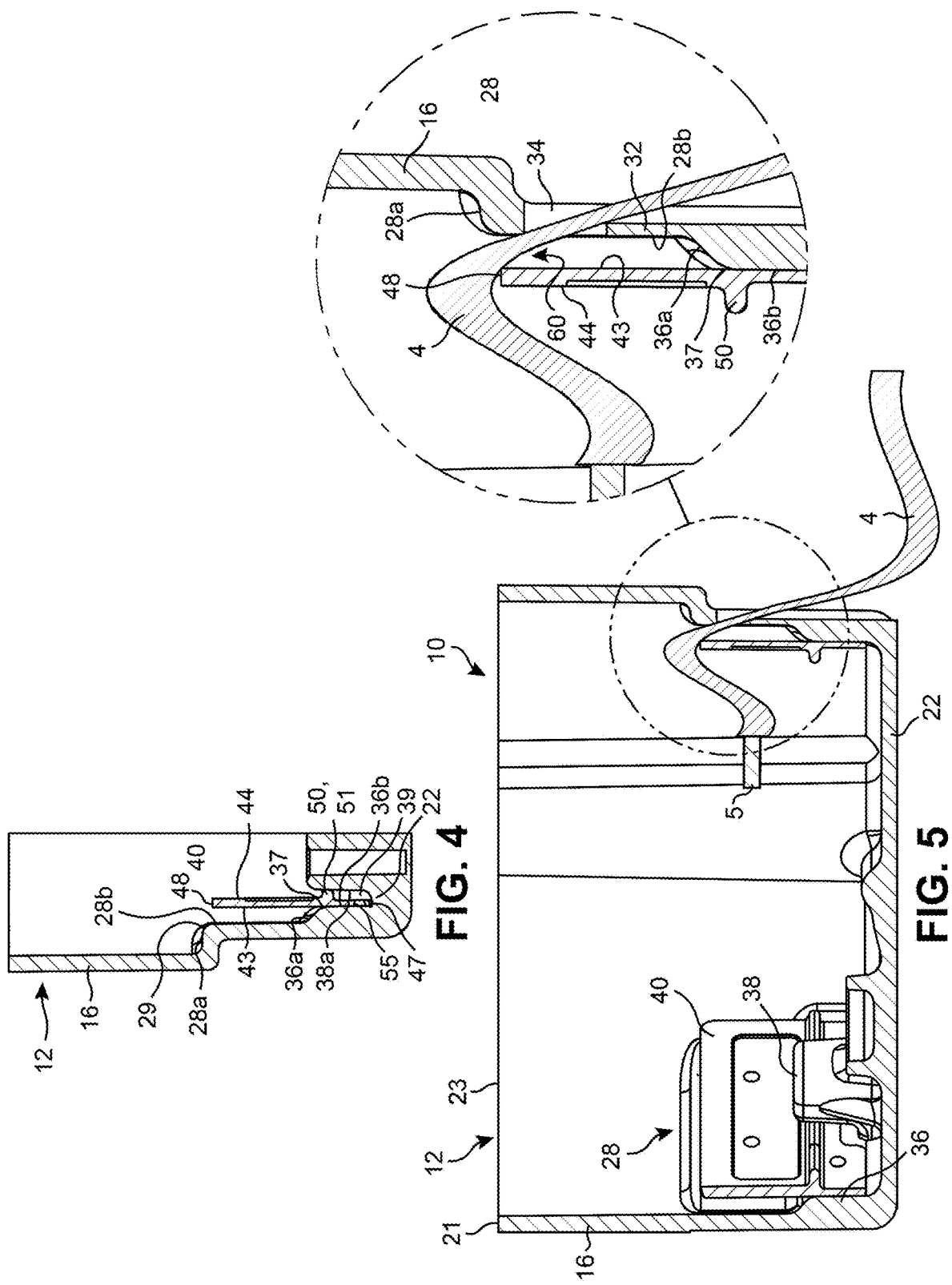

ELECTRICAL BOX

CROSS-REFERENCE TO RELATED APPLICATION

This patent application is a continuation patent application of U.S. patent application Ser. No. 18/658,121 which claims priority to U.S. Provisional Patent Application Ser. No. 63/511,954, filed on Jul. 5, 2023, the entire disclosures of each of which are hereby incorporated herein by reference.

FIELD OF THE INVENTION

The present invention relates to an electrical box assembly, and more particularly, to an electrical box including a clamping device used for anchoring or clamping an electrical cable inserted into an interior of the electrical box.

BACKGROUND OF THE INVENTION

Typically, an electrical box is used to support and contain electrical devices and wiring in a centralized space. The electrical box protects the wiring and electrical devices contained therein from extrinsic conditions such rain, snow, and fire, for example. A cover plate can be provided to further protect the wiring and electrical devices and militate against accidental contact with the wiring and devices. The electrical box is typically connected to a joist, a stud, or another structural component of a building acting as a mounting structure or surface.

Prior art electrical boxes include those boxes that use clamps retained by screws within the box to grip electrical cables inserted through box openings. These electrical boxes have the shortcoming that installation is relatively cumbersome, and tightening the clamps requires use of a screwdriver in the small confines of an electrical box.

Another variety of electrical box eliminates the screws and instead uses wedges which must be forced into place after the electrical cable is inserted into the box. These wedges are also difficult to manipulate within the confines of the box. In addition, provisions must be made in distributing and selling the boxes for either packaging the wedges such that they remain with the rest of the box, or for providing for the separate distribution of both boxes and wedges.

Another variety of electrical box utilizes a clamp attached to the box by a relatively pliant neck. In this variety of box, the neck is bent, the electrical cable is inserted into the box, and the clamp is then set by pressing it against the cable. Like other electrical boxes, this box has the shortcoming that the clamp must be manipulated within the box to secure the cable.

It is therefore highly desirable to provide an improved electrical box which retains electrical cables without the use of screws. It is also highly desirable to provide an improved electrical box in which clamps or wedges do not have to be tightened or set. It is further highly desirable to provide an improved electrical box by which electrical cables can be retained therein totally from the exterior of the box and without manipulation within the box. It is further highly desirable to provide an improved electrical box which may be shipped without the fear of loss or special packaging or distribution of the wedges or clamps.

One prior art electrical box seeking to address the above described concerns is disclosed in U.S. Pat. No. 4,724,282, the entire disclosure of which is incorporated herein by reference. However, the clamping or wedging features disclosed therein include a complicated construction and a complex method of installing such features within the corresponding electrical box. It would accordingly be desirable to produce an electrical box having a clamping or wedging feature that is simplified in form and that is more easily non-removably installed within the corresponding electrical box.

SUMMARY OF THE INVENTION

Consistent and consonant with the present invention, an electrical box assembly with improved structure for clamping or securing cables has surprisingly been discovered.

According to an embodiment of the present invention, an electrical box includes an enclosure having a bottom wall and a peripheral wall extending away from the bottom wall in an axial direction of the enclosure to define a cavity of the enclosure with a front opening of the enclosure providing access to the cavity thereof. A retainer wall extends axially from the bottom wall and is spaced from the peripheral wall with respect to an inward direction of the enclosure arranged transverse to the axial direction thereof. A clamping element is positioned and maintained in a clamp opening formed between the peripheral wall and the retainer wall by a press fit with the clamping element applying a clamping force to an electrical cable extending through a gap formed between the peripheral wall and the clamping element.

BRIEF DESCRIPTION OF THE DRAWINGS

The above advantages of the invention will become readily apparent to those skilled in the art from reading the following detailed description of an embodiment of the invention in the light of the accompanying drawings, in which:

FIG. 4 is a cross-sectional view of the cylindrical electrical box as taken from the perspective of section lines 4-4 in FIG. 3;

FIG. 5 is a cross-sectional view of the cylindrical electrical box as taken from the perspective of section lines 5-5 in FIG. 3;

DETAILED DESCRIPTION OF THE PREFERRED EMBODIMENT

Figure 1:
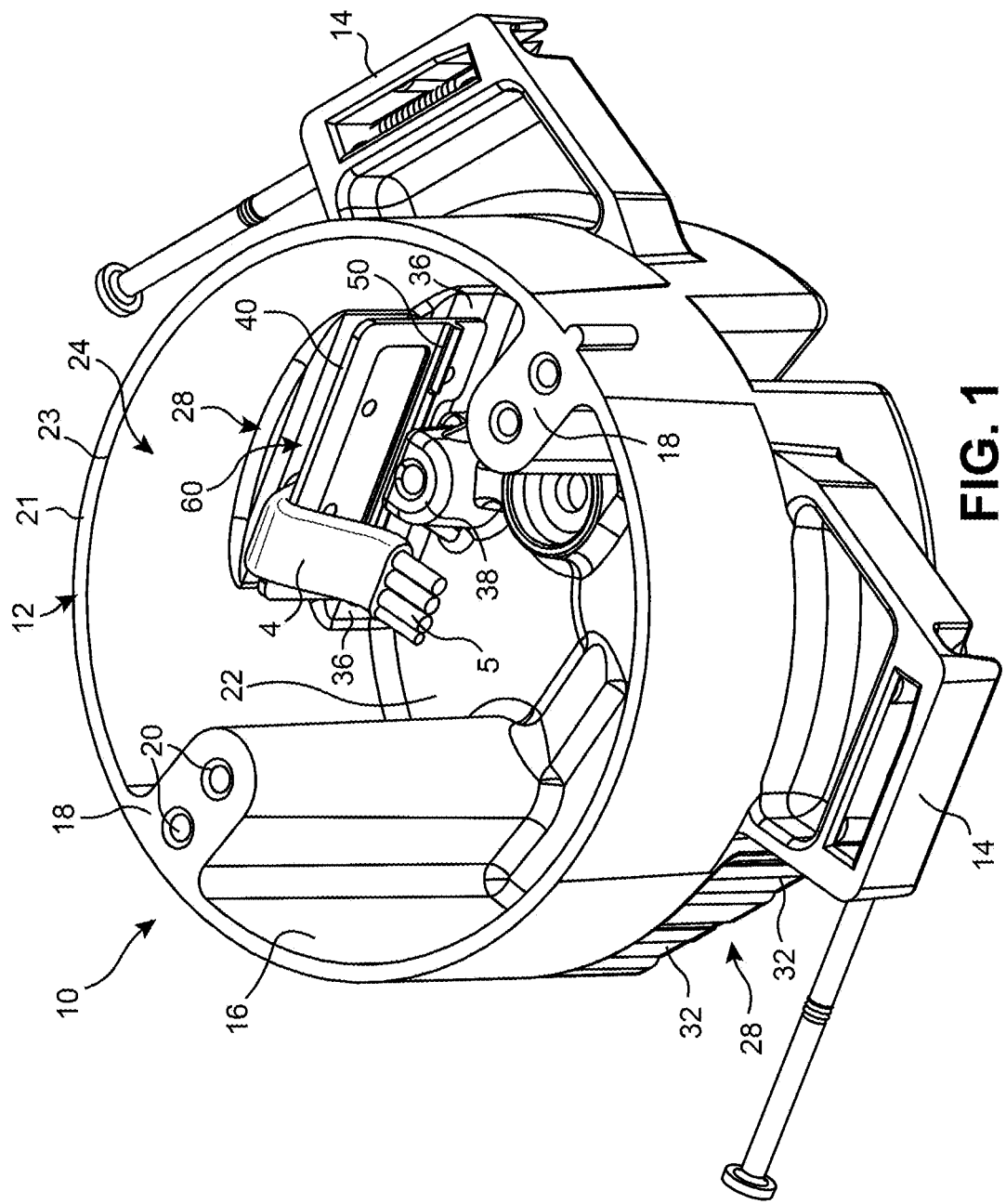
FIG. 1 is a front perspective view of a cylindrical electrical box having a clamping feature according to the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-5 illustrate an electrical box 10 according to an embodiment of the present invention. The electrical box 10 includes a nonmetallic enclosure 12 formed from a conventional tough polymer. The enclosure 12 includes a bottom wall 22 that cooperates with a peripheral wall 16 to define a cavity 24 of the enclosure 12. As utilized herein, the bottom wall 22 refers to a wall of the enclosure 12 formed opposite a front surface 21 of the enclosure 12, wherein the front surface 21 of the enclosure 12 includes a front opening 23 leading into the open space forming the cavity 24. The front opening 23 is generally provided for receiving an electric component into the cavity 24 via movement of the electric component in an axial direction of the enclosure 12, which extends from the front surface 21 to the bottom wall 22 thereof. The peripheral wall 16 generally extends in the axial direction of the enclosure 12 from the bottom wall 22 thereof to the front surface 21 thereof, wherein an axial end of the peripheral wall 16 disposed distally from the bottom wall 22 defines the front surface 21 of the enclosure 12 and forms a periphery of the front opening 23 of the enclosure 12. It should generally be understood that the bottom wall 22 does not necessarily refer to a bottommost disposed surface of the enclosure 12 (with respect to the direction of gravity)

when installed relative to a corresponding support structure or the like, as the electrical box 10 may be installed in any of variety of different orientations while remaining within the scope of the present invention. For example, the bottom wall 22 may form a laterally innermost portion of the enclosure 12 where the electrical box 10 is installed in a vertically arranged wall structure, or may alternatively form an uppermost portion of the enclosure 12 where the electrical box is installed in a horizontally arranged ceiling structure, as non-limiting examples.

The embodiment of FIGS. 1-5 includes a substantially cylindrical enclosure 12 having a substantially circular bottom wall 22, a substantially cylindrical peripheral wall 16, and a substantially cylindrical cavity 24 defined by the cooperation of the bottom wall 22 and the peripheral wall 16. However, as explained in greater-detail hereinafter when describing the embodiment of FIGS. 7 and 8, the general concepts of the present invention may be utilized in conjunction with an enclosure of substantially any configuration having a bottom wall 22 and a peripheral wall 16 extending axially therefrom, including a rectangular-shaped bottom wall 22 and peripheral wall 16, a hexagonally shaped bottom wall 22 and peripheral wall 16, a bottom wall 22 and a peripheral wall 16 having substantially any closed shape (including substantially any polygonal shape having any number or sides), or any combination of arcuate and/or rectilinear segments forming a closed shape.

The cylindrically-shaped embodiment of FIGS. 1-5 includes nail flanges 14 attached to the substantially cylindrical peripheral wall 16 of the enclosure 12. Cover plate mounts 18 including screw holes 20 may form a part of the peripheral wall 16 and are provided for attachment of a cover plate (not shown), as required. The enclosure 12 may include additional features projecting from or recessed within either of the bottom wall 22 or the peripheral wall 16 for aiding in the coupling or positioning of a corresponding electric component, as desired, without necessarily departing from the scope of the present invention.

The cylindrical enclosure 12 may include one or more casing sections 28 projecting inwardly from the otherwise cylindrically shaped peripheral wall 16. Each of the casing sections 28 may be provided as an inwardly indented portion of the peripheral wall 16 that defines a shoulder 29 at a position radially inwardly from a portion of the peripheral wall 16 disposed axially outwardly (upwardly) from the corresponding casing section 28 in a direction towards the front surface 21 of the enclosure 12. In the present embodiment, the portion of the peripheral wall 16 disposed axially outwardly from the casing section 28 refers to a substantially cylindrical portion of the peripheral wall 16, but the axially outward portion of the peripheral wall 16 may include a different configuration while remaining within the scope of the present invention. That is, each of the casing sections 28 of the embodiment shown in FIGS. 1-5 includes a radially extending segment 28a of the peripheral wall 16 extending radially inwardly from the axially outwardly disposed (and cylindrically shaped) portion of the peripheral wall 16 and an axially extending segment 28b extending axially from an inner end of the radially extending segment 28a and towards the bottom wall 22 of the enclosure 12, wherein the shoulder 29 is formed where the radially extending segment 28a meets the axially extending segment 28b of each respective casing section 28. The radially extending segment 28a is arranged transverse to the axial direction of the enclosure 12, and may be arranged in the purely radial direction of the enclosure 12 (perpendicular to the axial direction), or may be arranged at an incline with respect to each of the axial direction and the radial direction of the enclosure 12, so long as the radially inward extension of the corresponding radially extending segment 28a results in the corresponding axially extending segment 28b, and hence the corresponding shoulder 29, being offset in the radial inward direction relative to the cylindrically-shaped portion of the peripheral wall 16 from which the corresponding casing section 28 is intended inwardly.

The axially extending segment 28b may be substantially planar in configuration and arranged on a plane that is substantially parallel to the axial direction of the enclosure 12 while intersecting the remainder of the cylindrically-shaped peripheral wall 16 at two angularly displaced lateral positions, thereby resulting in the axially extending segment 28b of each of the casing sections 28 having the arrangement of a chord of the circularly shaped peripheral wall 16 when viewed from a perspective along the axial direction of the enclosure 12. The chord-like configuration of the axially extending segment 28b results in the shoulder 29 and the axially extending segment 28b of each of the corresponding casing sections 28 merging with the inner surface of the cylindrically-shaped portion of the peripheral wall 16 at opposing lateral ends of the axially extending segment 28b and/or shoulder 29, with a distance present between the inner surface of the cylindrically-shaped portion of the peripheral wall 16 and each of the shoulder 29 and the axially extending segment 28b increasing when extending towards a central region of the corresponding casing section 28 away from either of the opposing lateral ends thereof.

Figure 2:
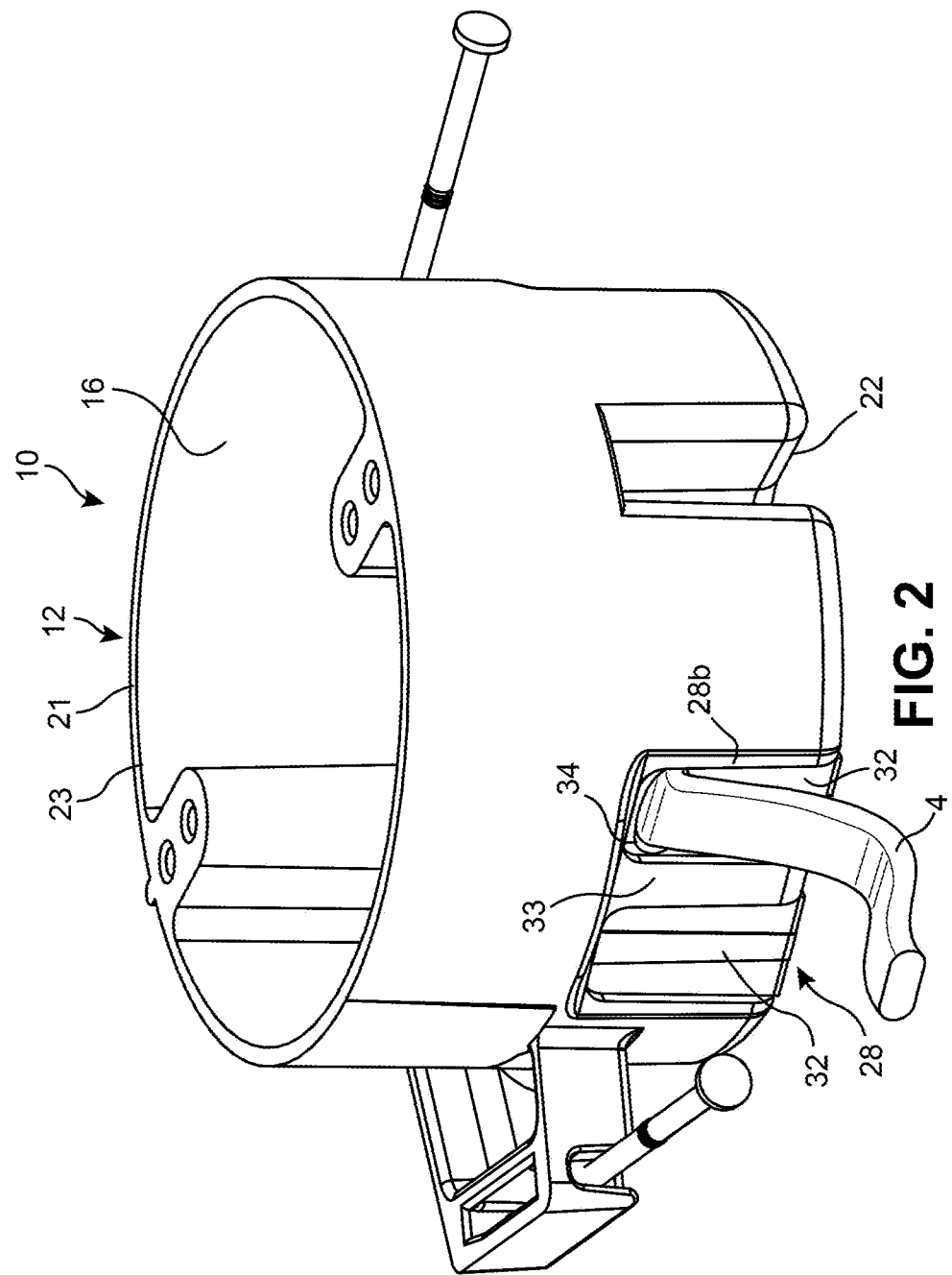
FIG. 2 is a rear perspective view of the cylindrical electrical box.
Figure 3:
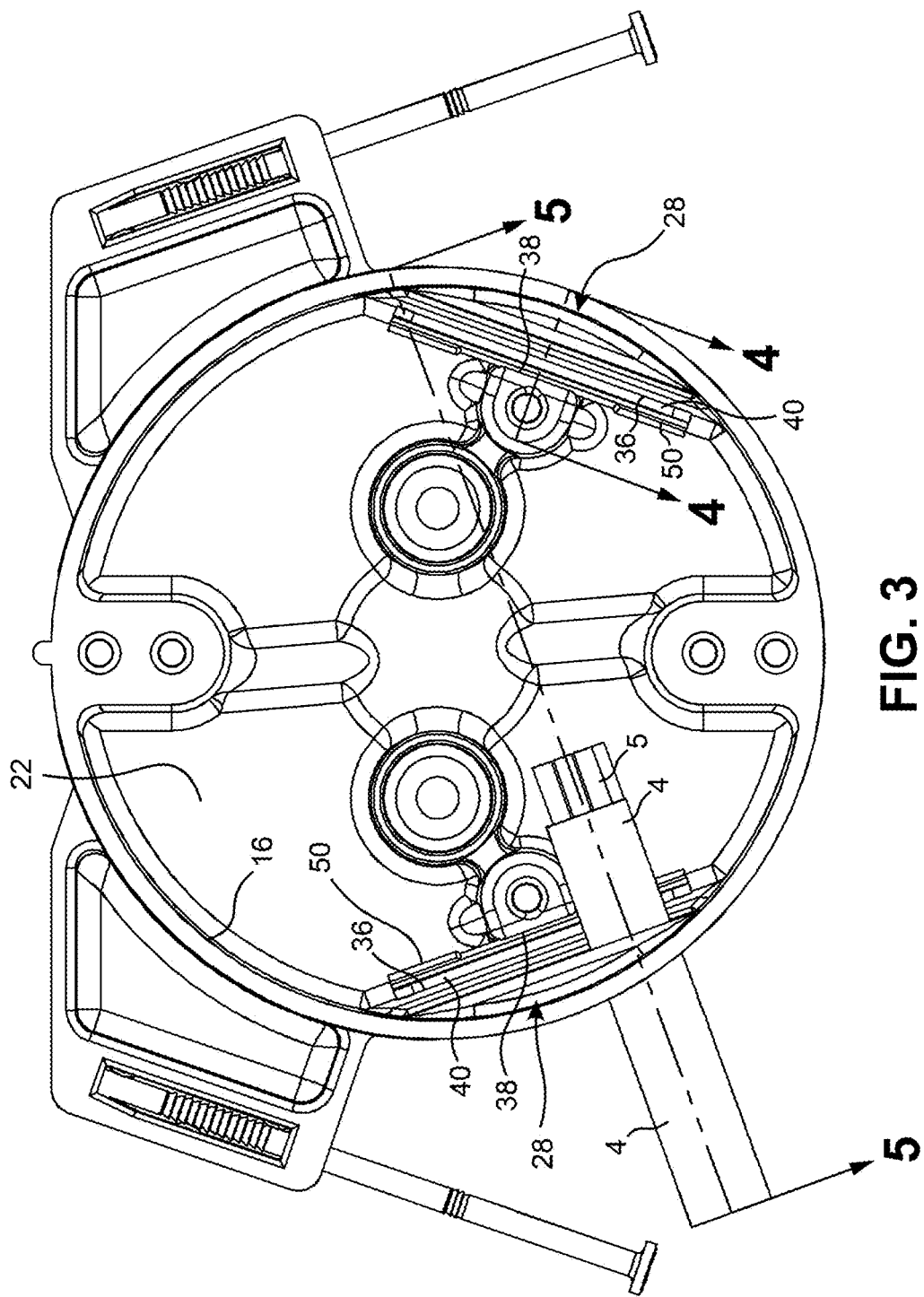
FIG. 3 is a top plan view of the cylindrical electrical box.

As best shown in FIG. 2, which illustrates the peripheral wall 16 from an exterior perspective, each of the casing sections 28 includes a pair of window portions 32 formed within the axially extending segment 28b and a divider 33 extending axially therebetween to separate the window portions 32 from one another in a lateral direction perpendicular to the axial direction. Within each of the window portions 32 a (cable) opening 34 may be provided or otherwise formed by a user of the electrical box 10. In a specific embodiment of the electrical box 10 of the present invention, the window portions 32 are provided as "knock-outs" that may be penetrated or otherwise removed by an operator to form the corresponding opening 34 therein, such as by applying pressure to the corresponding casing section 28 along one of the window portions 32 to break-away or separate at least a portion of the axially extending segment 28b of the peripheral wall 16 forming the window portion 32 for providing access to the interior disposed cavity 24 of the enclosure 12. Each of the window portions 32 may be formed by a portion of the axially extending segment 28b having a locally reduced or minimized thickness for facilitating the ability to penetrate or otherwise break through the peripheral wall 16 in the manner described, as desired. The openings or "knock-out" openings 34 may be formed through one of the window portions 32 within the axially extending segment 28b of the peripheral wall 16 at an axial distance from the bottom wall 22, such as by forming one of the openings 34 adjacent a periphery of one of the window portions 32 disposed immediately beneath the transition from the cylindrically-shaped peripheral wall 16 to the indented configuration of the corresponding casing section 28. As shown and explained hereinafter, such a positioning of the opening 34 may allow for a more direct passage of an electrical cable 4 through a clamping feature of the disclosed electrical box 10.

As shown in FIGS. 1 and 3-5, the inner surface of the peripheral wall 16 disposed along each of the casing sections 28 further includes a sill wall projection 36 where the inner surface of the peripheral wall 16 projects radially inwardly relative to the adjacent disposed and substantially planar axially extending segment 28b of the corresponding one of the casing sections 28. Each of the sill wall projections 36 includes the formation of a radially extending surface 36a extending radially inwardly away from the plane of the axially extending segment 28b and an axially extending surface 36b extending axially from the radially extending surface 36a in a direction towards the bottom wall 22 of the enclosure 12, wherein the axially extending surface 36b is substantially planar in configuration and intersects the bottom wall 22 at a position offset radially inwardly relative to the plane of the axially extending segment 28b of the corresponding one of the casing sections 28. The radially extending surface 36a may be disposed at an incline relative to the axial and radial directions or may be provided to be purely radial in extension (and hence perpendicular to the disclosed axial direction), so long as the corresponding radial extension thereof results in the necessary radial offset between the plane of the axially extending segment 28b and the plane of the axially extending surface 36b of the corresponding one of the sill wall projections 36. A shoulder 37 is formed where the radially extending surface 36a intersects the axially extending surface 36b with the shoulder 37 preferably disposed immediately below the opening 34 formed through the corresponding one of the window portions 32. Each of the sill wall projections 36 may correspond to a locally maximized thickness of the peripheral wall 16 along the corresponding one of the casing sections 28 due to the radial inward extension of the inner surface along such regions of the peripheral wall 16.

The bottom wall 22 may further include one or more retainer walls 38 corresponding to each of the casing sections 28 having at least one of the window portions 32, wherein each of the retainer walls 38 is formed by an axially projecting portion of the bottom wall 22 that is spaced apart from the axially extending surface 36b of the corresponding one of the sill wall projections 36 with respect to the radially inward direction of the enclosure 12. Each of the retainer walls 38 is provided to include an axially extending surface 36a that is arranged on a plane substantially parallel to the facing axially extending surface 36b of the corresponding one of the sill wall projections 36 with the axially extending surface 38a of the corresponding one of the retainer walls 38 spaced apart radially inwardly from the facing and oppositely arranged axially extending surface 36b of the corresponding one of the sill wall projections 36. The axially extending surface 38a of each of the retainer walls 38 may extend axially away from the bottom wall 22 by an axial distance substantially similar to that of the facing axially extending surface 36b of the corresponding one of the sill wall projections 36 to form a substantially rectangular-cuboid shaped (clamp) opening 39 (FIG. 4) therebetween due to the intervening portion of the bottom wall 22 being arranged in the radial direction of the enclosure 12. As can be seen throughout the figures, each of the retainer walls 38 may extend along only a central portion of each of the facing sill wall projections 36 to result in the lack of the presence of one of the retainer walls 38 at each of the lateral ends of the corresponding one of the sill wall projections 36. Each of the lateral ends of the corresponding one of the sill wall projections 36 may further be arranged in alignment with one of the window portions 32, and thus one of the corresponding openings 34 formed through the peripheral wall 16.

Figure 6:
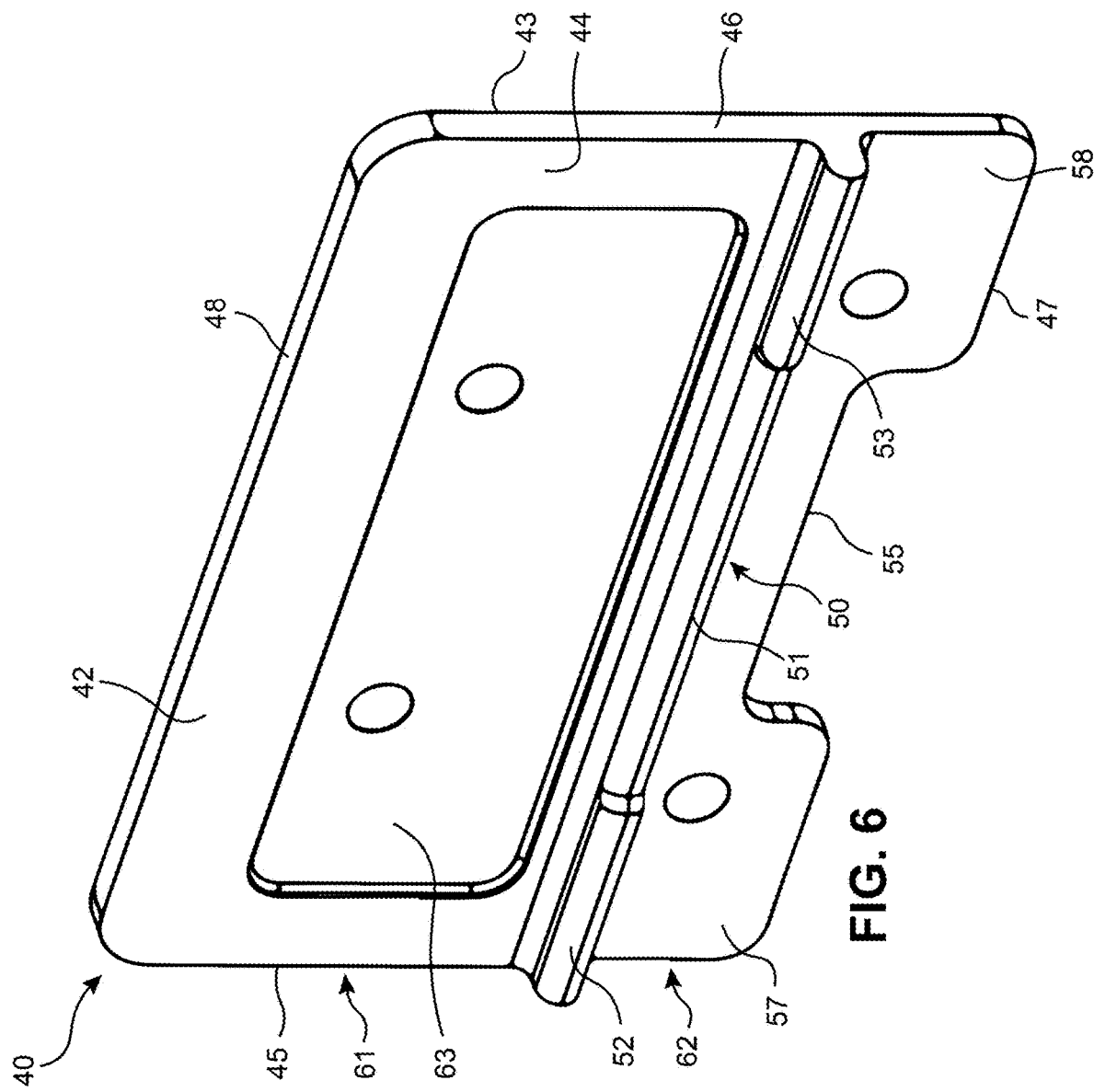
FIG. 6 is a perspective view of a clamping element of the cylindrical electrical box shown in isolation.

Each of the openings 39 formed directly between a corresponding set of one of the sill wall projections 36 and a facing one of the retainer walls 38 is configured to receive a clamping element 40 therein. As best shown in FIG. 6, which shows one of the clamping elements 40 in isolation, each of the clamping elements 40 includes a substantially planar and plate-like main body 42 that has a substantially rectangular perimeter shape. The plate-like configuration of the main body 42 results in the main body 42 having an opposing set of substantially parallel-arranged major surfaces that form the majority of the surface area of the main body 42, wherein the major surfaces may be referred to as the outward facing surface 43 and the inward facing surface 44 of the main body 42. The outward facing surface 43 refers to the major surface of the main body 42 facing outwardly towards the inner surface of the peripheral wall 16, which in the present configuration corresponds to the outward facing surface 43 facing towards the adjacent disposed casing section 28 having the window portions 32 as well as the underlying sill wall projection 36 of the corresponding casing section 28. The inward facing surface 44 refers to the major surface of the main body 42 facing inwardly towards a central region of the enclosure 12 and the corresponding retainer wall 38. A thickness direction of the main body 42 is accordingly arranged perpendicular to the axial direction of the enclosure 12 and extends in the inward-outward direction thereof. Each of the major surfaces 43, 44 extends laterally from a first lateral side 45 of the main body 42 to an opposing second lateral side 46 thereof and axially from a lower axial end 47 of the main body 42 to an upper axial end 48 thereof. The lower axial end 47 corresponds to the end of the main body 42 configured to face towards and/or engage the bottom wall 22 of the enclosure 12 while the upper axial end 48 corresponds to the end of the main body configured to face towards the front surface 21 of the enclosure 12 and away from the bottom wall 22.

The main body includes a protuberance 50 that projects away from the inward facing surface 44 at a position intermediate the lower axial end 47 and the upper axial end 48 of the main body 42. The protuberance 50 protrudes from the inward facing surface 44 in the inward direction of the enclosure 12 (perpendicular to the axial direction of the enclosure 12) towards the corresponding retainer wall 38 and further extends laterally between the first and second lateral sides 45, 46 of the main body 42. The protuberance 50 may be divided laterally into a central portion 51, a first lateral portion 52 disposed laterally relative to the central portion 51 and towards the first lateral side 45 of the main body 42, and a second lateral portion 53 disposed laterally relative to the central portion 51 (opposite the first lateral portion 52) and towards the second lateral side 46 of the main body 42. As can be seen in FIG. 6, the central portion 51 may protrude a first distance from the inward facing surface 44 and each of the lateral portions 52, 53 may protrude a second distance from the inward facing surface 44 that is greater than the first distance.

The protuberance 50 divides the main body 42 into an axially inner (lower) portion 61 to a first side of the protuberance 50 and an axially outer (upper) portion 62 to an opposing second side of the protuberance 50, wherein the lower portion 61 is disposed towards the bottom wall 22 and the upper portion 62 is disposed towards the front surface 21 of the enclosure 12. A thickness of the main body 42 may differ between the lower portion 61 and the upper portion 62, wherein the upper portion 62 may include an increased thickness in comparison to the lower portion 61. The upper portion 62 may further include a recessed portion 63 having a perimeter that is spaced apart from the protuberance 50 and the other three surrounding side/end surfaces 45, 46, 48. The recessed portion 63 may include a reduced thickness in comparison to the remainder of the upper portion 62, such as including a thickness that is substantially similar to the thickness of the lower portion 61. The recessed portion 63 is shown as being recessed relative to the inward facing surface 44 of the main body 42, although the recessed portion 63 may alternatively be recessed relative to the outward facing surface 43 without necessarily departing from the scope of the present invention, as desired.

The lower axial end 47 of the main body 42 may include an indentation 55 formed therein along a central region thereof that extends axially outwardly (upwardly) towards the front surface 21 of the enclosure 12. The indentation 55 may be arranged to extend towards the central portion 51 of the protuberance 50 and between the lateral portions 52, 53 thereof. The presence of the indentation 55 results in the formation of a first lateral leg 57 and a second lateral leg 58 within the lower portion 61 of the main body 42, wherein each of the lateral legs 57, 58 is configured to engage the bottom wall 22 of the enclosure 12 when the clamping element 40 is fully received within the corresponding opening 39.

The clamping element 40 is configured to be received within a corresponding one of the openings 39 in a press-fit manner that prevents subsequent removal of the clamping element 40 from the corresponding one of the openings 39 upon installation thereof. Specifically, the clamping element 40 is positioned such that the indentation 55 formed in the lower axial end 47 is positioned directly between the corresponding sill wall projection 36 and retainer wall 38 with respect to the inward-outward (radial) direction. The outward facing surface 43 of the main body 42 is arranged parallel to and engages the axially extending surface 36b of the sill wall projection 36 and the inward facing surface 44 (with the exception of the protuberance 50 protruding therefrom) is spaced apart from the axially extending surface 38a of the retainer wall 38. In the present embodiment, only the central portion 51 of the protuberance 50 engages the axially extending surface 38a of the retainer wall 38 (due to the limited lateral extension of the retainer wall 38) while each of the lateral portions 52, 53 of the protuberance 50 are disposed laterally outwardly relative to the retainer wall 38.

A distance present between the outward facing surface 43 of the main body 42 and a distal surface of the central portion 51 of the protuberance 50 may be selected to be slightly greater than a distance present between the axially extending surface 36b of the sill wall projection 36 and the axially extending surface 38a of the retaining wall 38 to facilitate the press-fit reception of the clamping element 40 between the sill wall projection 36 and the retainer wall 38 in a non-removable fashion. The clamping element 40 may be received axially within the opening 39 until the lower axial end 47 of the main body 42 along the lateral legs 57, 58 is engaging the bottom wall 22 of the enclosure 12, whereas the lower axial end 47 may be spaced apart from the bottom wall 22 along the indentation 55 disposed directly between the retainer wall 38 and the sill wall projection 36. The protuberance 50 may be positioned axially immediately adjacent and opposite the shoulder 37 of the sill wall projection 36 such that the lower portion 61 of the main body 42 is received directly within the opening 39 while the upper portion 62 of the main body 42 extends outwardly from the opening 39 and towards the front opening 23 of the enclosure 12.

Although the axially extending surfaces 36b, 38a of the respective sill wall projection 36 and retainer wall 38 have thus far been described as being substantially parallel to one another, in some embodiments there may be a very slight taper present therebetween such that there is a decreasing distance present therebetween when progressing in the axial direction towards the bottom wall 22 along the corresponding one of the openings 39. Such a slight taper may aid in guiding the clamping element 40 axially into the opening 39 until the distance present between the axially extending surfaces 36b, 38a is sufficiently small enough to establish the non-removable press-fit coupling of the clamping element 40 to the enclosure 12. This slight taper may include an angle of inclination present between the axially extending surfaces 36b, 38a being less than 5°, such as being about 2-3°, wherein either or both of the axially extending surfaces 36b, 38a may be inclined relative to the axial direction to achieve such a slight taper. The sill wall projection 36 and/or the retainer wall 38 may also include an arcuate shape at an entrance into the opening 39, such as at the shoulder 37, for aiding in piloting the clamping element 40 therein during axial motion thereof towards the bottom wall 22.

The first lateral portion 52 of the protuberance 50 may be disposed immediately inward of and adjacent (aligned with) a first one of the window portions 32 corresponding to one of the casing sections 28 while the second lateral portion 53 of the protuberance 50 may be disposed immediately inward of and adjacent (aligned with) a second one of the window portions 32 corresponding to the one of the casing sections 28.

The clamping element 40 is formed from a substantially rigid and resiliently flexible material such that an elastic deformation of the clamping element 40 results in the clamping element 40 attempting to resiliently return to the original configuration thereof as would be present in the absence of a force causing such an elastic deformation. The clamping element 40 may be formed from a plastic material such as polyvinyl chloride or a resilient metal material, as non-limiting examples. It should be understood that a variety of different polymeric materials or metallic materials may include the necessary degree of rigidity and resiliency to result in the clamping element 40 operating in the manner described herein.

The clamping element 40 is also not necessarily limited to the specific configuration shown and described with reference to FIG. 6. More specifically, the clamping element 40 may be formed to include a variety of different configurations so long as the clamping element 40 includes the substantially plate-like main body 42 having the opposing major surfaces 43, 44 and the inclusion of the protruding protuberance 50 for dividing the main body 42 into the upper portion 61 and the lower portion 62 while otherwise differing from the specific embodiment as shown and described herein in certain respects. For example, possible variations to the clamping element 40 may include the protuberance 50 having a consistent cross-sectional shape (and hence degree of protrusion away from the outwardly facing surface 44) when extending between the lateral sides 45, 46 of the main body 42, the protuberance 50 extending along only a portion of the lateral dimensions of the main body 42 (such as extending only along portions of the main body 42 aligned with the retainer wall 38), the upper portion 61 and the lower portion 62 having the same thickness to either side of the protuberance 50, the lack of the presence of the recessed portion 63 in one of the major surfaces 43, 44, and/or the lack of the presence of the indentation 55 within the lower axial end 47 of the main body 42 without necessarily departing from the scope of the present invention. The described features may be beneficial in causing the clamping element 40 to have a desired degree of stiffness and resiliency with respect to various different lateral positions and/or axial positions along the main body 42, thereby prescribing a desired clamping effect when the clamping element 40 is deformed away from the original (non-deformed) configuration thereof. That is, the thickness, lateral extension, or axial extension of the clamping element 40 along various axes may be varied in accordance with the disclosed configuration for stiffening the clamping element 40 relative to such axes for prescribing the desired stiffness and/or resiliency when undergoing the application of a deforming force to the clamping element 40.

As described above, the window portions 32 are generally aligned with the laterally positioned regions of the clamping element 40 that are not disposed directly between the corresponding pairing of the retainer wall 38 and the sill wall projection 36 such that the clamping element 40 is typically subjected to a deforming force along such laterally positioned regions thereof when attempting to insert the electrical cable 4 thereby, hence the stiffness of the clamping element 40 may in some circumstances be increased along such portions to ensure a suitable clamping force when attempting to resiliently return to the original configuration thereof. The presently disclosed embodiment accordingly includes the thickness of the main body 42 being relatively increased along the lateral regions of the upper portion 61 thereof (where devoid of the recessed portion 63) as well as the inclusion of the increased protrusion of the lateral portions 52, 53 of the protuberance 50 along the lateral regions of the main body 42 such that the stiffness of the clamping element 40 is relatively increased along such lateral regions. The features of the clamping element 40 as shown and described may accordingly be varied to account for different arrangements of the corresponding window portions 32 and openings 34 in enclosures 12 of differing configurations. For example, when three of the window portions 32 are disposed laterally within the same casing section 28 of the enclosure 12, the clamping element 40 may include a repeating of the disclosed configuration when continuing in the lateral direction for aligning the desired features of the clamping element 40 with each of the window portions 32, such as including a second laterally disposed one of the indentations 55, another segment of the protuberance 50 having the increased degree of protrusion from the main body 42, and/or the inclusion of a second laterally disposed recessed portion 63.

The electrical box 10 may be used by first "knocking out" or otherwise forming one or more of the openings 34 from one or more of the window portions 32, as desired. An electrical cable 4 can then be inserted through the selected openings 34 from the outside of the electrical box 10. The electrical cable 4 has a series of wires 5, each of which comprises an insulated conductor enclosed by an exterior sheath. The electrical cable 4 utilized with the electrical box 10 may be selected to include a height, width, or diameter dimension (any dimension perpendicular to the longitudinal direction thereof) that is normally at least as great or greater than the distance present between the axially extending surface 28b of the casing section 28 and the inward facing surface 43 of the main body 42 at the upper axial end 48 thereof. For example, the electrical cable 4 may corresponding to a 10, 12, or 14 gauge cable/wire, such as a 10/3 Romex brand wire, as one non-limiting example.

The insertion of the electrical cable 4 deforms or deflects the clamping element 40 away from the casing section 28, and more specifically deforms the upper axial end 48 of the clamping element 40 away from the axially extending segment 28b thereof, in the radially inward direction towards a central region of the electrical box 10 and away from the peripheral wall 16 to allow for passage of the electrical cable 4 through a gap 60 present therebetween. The protruding of the protuberance 50 away from the inwardly facing surface 44 of the main body 42 also facilitates the ability of the clamping element 40 to deform in the described manner as a result of the existence of the radial gap present between the upper portion 61 of the clamping element 40 and the facing axially extending surface 38a of the retainer wall 38. The resiliency of the clamping element 40 results in the clamping element 40 attempting to return to the original configuration thereof (prior to insertion of the electrical cable 4) such that a radially outward force is applied to the electrical cable 4 by the clamping element 40, which also presses the electrical cable 4 against the axially extending surface 28b of the casing section 28. The electrical cable 4 is accordingly clamped between the clamping element 40 and the portion of the peripheral wall 16 forming the casing section 28 when progressing axially upwardly over the upper axial end 48 of the main body 42. The electrical cable 4 may accordingly take on a shape where the electrical cable 4 extends axially upwardly over the upper axial end 48 before turning and extending radially inwardly when extending beyond the inward facing surface 44. The electrical cable 4 may accordingly take on a substantially sinusoidal shape when received through the opening 4 and when clamped by the clamping element 40. An end of the electrical cable 4 is extended to a position beyond the clamping element 40 to allow for any wires 5 disposed at the end of the electrical cable 4 to be coupled to another electrical component disposed within the cavity 24 of the enclosure 12.

The flexing of the clamping element 40 may occur relative to a laterally extending axis passing through the clamping element 40 adjacent the shoulder 37 of the sill wall projection 36 such that the lower portion 62 of the clamping element 40 undergoes relatively little deformation while the upper portion 61 thereof flexes arcuately away from the axially extending surface 28b of the casing section 28. The cooperating clamping element 40 and sill wall projection 36 may resemble a form of K-clamp due to the configurations thereof. The lower portion 62 may undergo the reduced amount of deformation due to the affixing of the position of the lower portion 62 between the retainer wall 38 and the sill wall projection 36 at the laterally central region of the clamping element 40. In some circumstances, the clamping element 40 may also undergo some degree of flexing relative to an axially extending axis arranged at a position between the retainer wall 38 and the sill wall projection 36 due to the lack of constraint of the clamping element 40 along the lateral regions thereof. As described above, the degree of flexure and the resulting clamping force applied by the clamping element 40 may be dependent on the positioning of the electrical cable 4 relative to any stiffening features of the clamping element 40 or relative to the positions where the clamping element 40 is non-removably constrained between the retainer wall 38 and the sill wall projection 36.

In view of the clamping effects described above, the clamping element 40 of the disclosed embodiment may generally include at least two different positions, including a first position where the clamping element 40 is in the non-deformed configuration prior to the insertion of one of the electrical wires 4 and a second position wherein the clamping element is at least partially deformed and resiliently pressing against the electrical cable 4 following the insertion of the electrical cable 4 through one of the openings 34 and past the upper axial end 48 of the clamping element 40. The described second position may include the electrical cable 4 passing over a laterally disposed region of the clamping element 40 such that the deformation of the clamping element 40 is greater to one side of the retaining wall 38 than the opposing and non-utilized side thereof. The clamping element 40 may further be adjustable to a third position where another one of the electrical cables 4 is received through another opening 34 corresponding to the other lateral region of the clamping element 4 such that the electrical cables 4 are clamped to both sides of the retainer wall 38, which may include substantially similar deformation of the clamping element 40 to each of the opposing lateral sides of the retainer wall 38.

Figure 7:
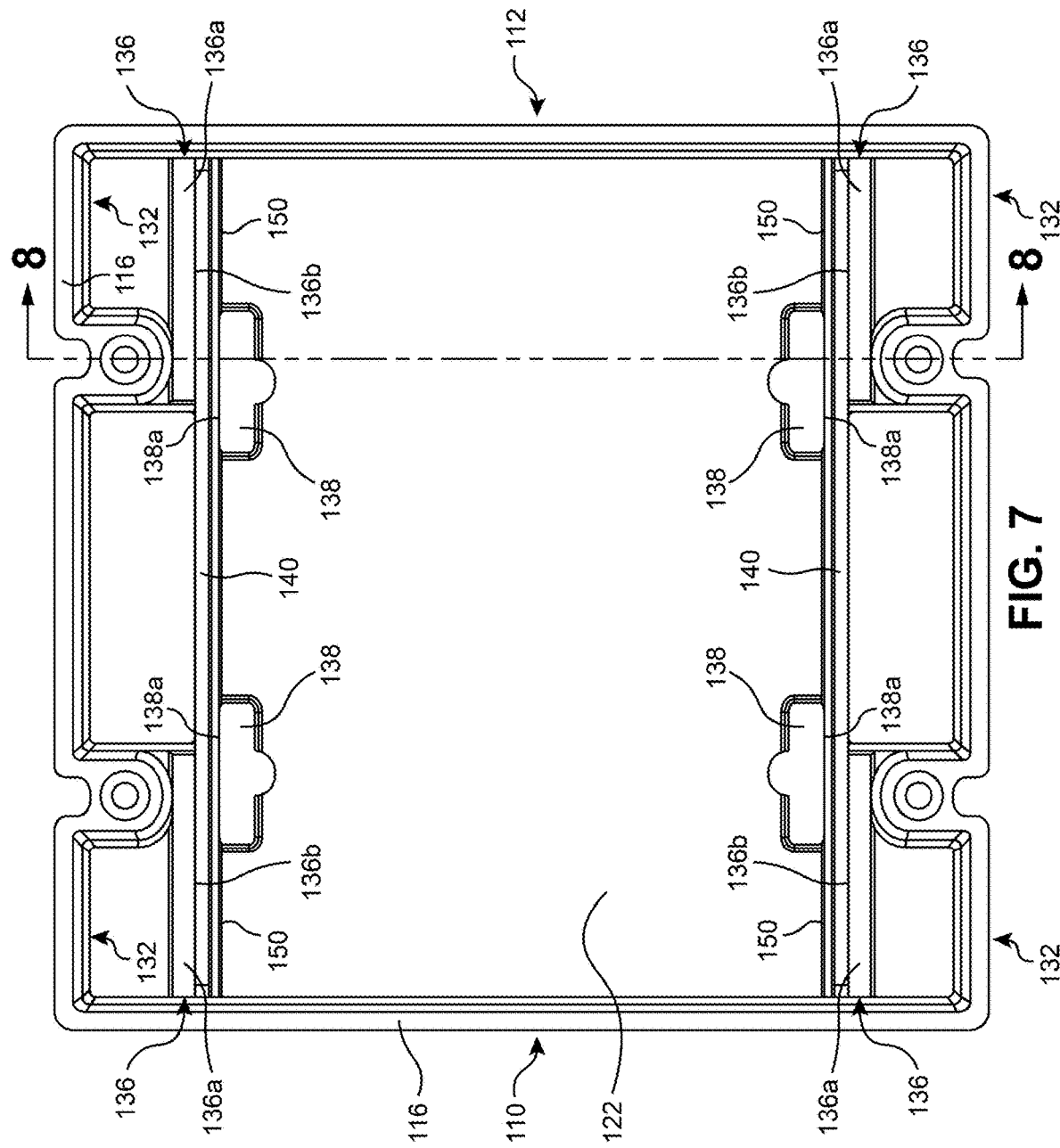
FIG. 7 is a top plan view of a rectangular electrical box according to another embodiment of the present disclosure.
Figure 8:
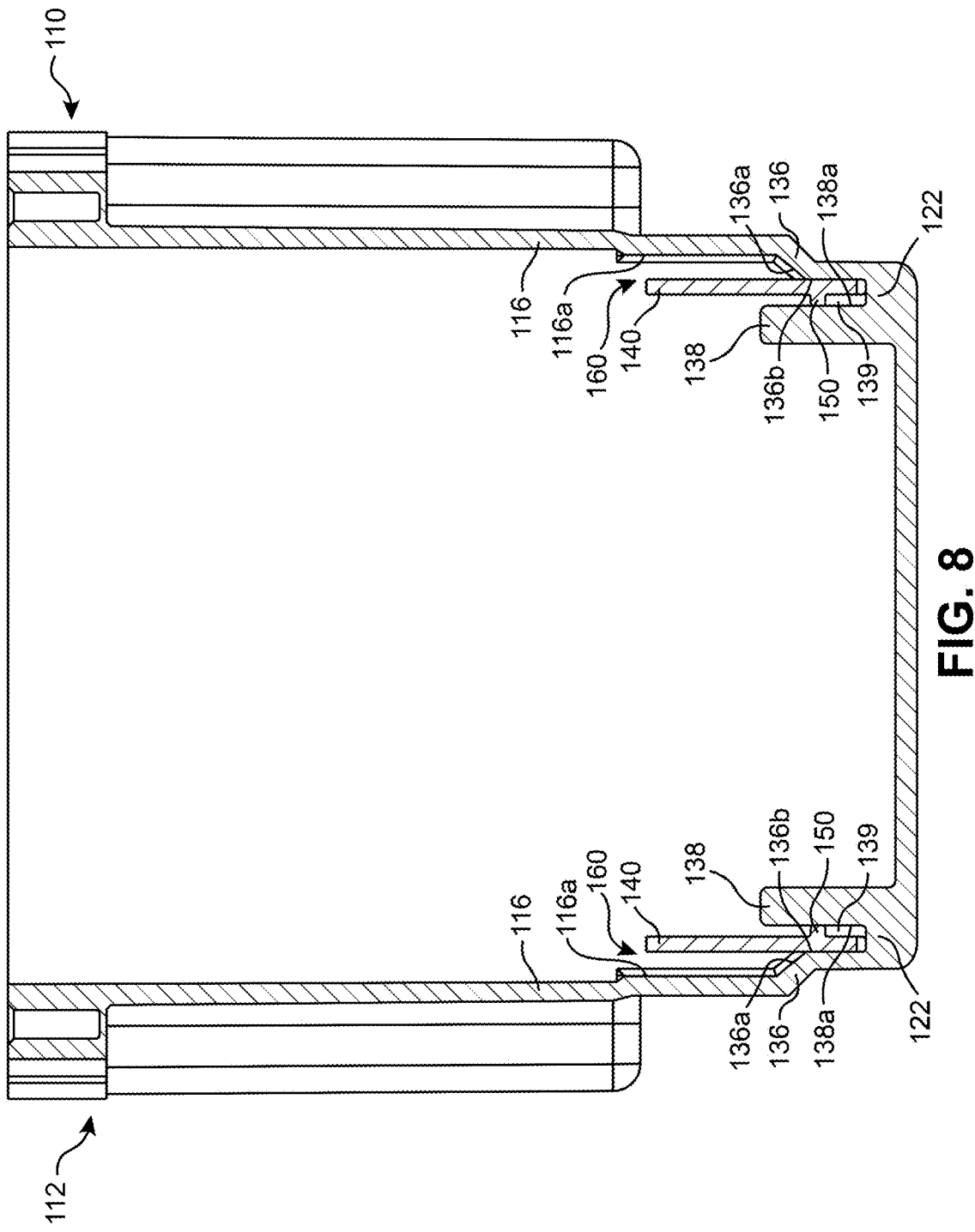
FIG. 8 is a cross-sectional view of the rectangular electrical box as taken from the perspective of section lines 8-8 in FIG. 7.

Referring now to FIGS. 7 and 8, an electrical box 110 according to another embodiment of the present invention is disclosed. The electrical box 110 is substantially similar to the electrical box 10 and identifies the corresponding features thereof with the addition of 100 to the reference characters utilized in identifying the electrical box 10, hence further description is not provided with the exception of those features that substantively differ between the electrical boxes 10, 110.

The electrical box 110 includes a substantially rectangular cuboid enclosure 112 in comparison to the substantially cylindrical enclosure 12 of the electrical box 10, which results in the lack of the need for the introduction of an inwardly indented casing section 28 within the electrical box 110. That is, there is no need to establish a substantially planar portion of a peripheral wall that deviates from the otherwise cylindrical shape thereof when utilizing a peripheral wall 116 already having a substantially planar configuration such is the case with an electrical box utilizing a polygonal and closed peripheral shape. As such, the electrical box 110 may include the corresponding window portions 132 thereof being formed at substantially any position along one of the substantially planar segments of the peripheral wall 116 without requiring the indentation of the peripheral wall 116 relative to those segments devoid of such window portions 132. Each of the window portions 132 may be formed by any portion of the peripheral wall 116 capable of being penetrated or otherwise "knocked-out," which may include the peripheral wall 116 having a reduced thickness along such window portions 132 in comparison to the remainder of the peripheral wall 116 in similar fashion to the depiction of the window portion 32 in FIG. 5.

The lack of the need for the formation of a casing section 28 within the peripheral wall 116 results in each of the corresponding sill wall projections 136 including an inwardly extending surface 136a (analogous to the radially extending surface 36a of the cylindrical electrical box 10) that projects inwardly from an axially extending surface 116a of the peripheral wall 116 for the purpose of providing a gap 160 between a corresponding clamping element 140 and the axially extending surface 116a, wherein the gap 160 is configured to receive one of the electrical cables 4 therein in the same fashion as described with reference to the electrical box 10. An opening 139 is similarly formed between an axially extending surface 136b of the sill wall projection 136 and an axially extending surface 138a of a facing portion of a retainer wall 138, which once again projects axially outwardly away from a bottom wall 122 of the enclosure 112.

The clamping element 140 once again includes a plate-like configuration with a protuberance 150 protruding therefrom for establishing a press-fit reception of the clamping element 140 within the opening 139. The clamping element 140 is shown in FIGS. 7 and 8 as having a substantially simplified configuration devoid of several of the variations in thickness of the clamping element 140 or the degree of protrusion of the protuberance 150, although it should be readily understood that such features may be incorporated into the clamping element 140 in the same manner as described with reference to the features of the clamping element 40 for prescribing the degree of stiffness and resiliency within the clamping element 140 at prescribed axial and lateral positions therein. Each of the clamping elements 140 is further shown as extending across an entirety of a planar segment of the peripheral wall 116 for accommodating opposing window portions 132 formed at opposing sides or ends of the enclosure 112. However, it should be readily apparent that each of the disclosed clamping elements 140 may be divided into two or more independents ones of the clamping elements 140 with each of the clamping elements 140 associated with only a single one or set of the window portions 132 while remaining within the scope of the present invention, as desired. For example, the enclosure 112 of FIG. 7 includes four of the retainer walls 138 and two of the clamping elements 140 with each of the two clamping elements 140 spanning two of the retainer walls 138, but may alternatively include each of the retainer walls 138 associated with a single one of the clamping elements 140.

The clamping elements 40, 140 shown and described herein provide numerous benefits over the clamping structures of the prior art. First, the construction of each of the clamping elements 40, 140 allows for each of the clamping elements 40, 140 to be press-fit into the respective clamp opening 39, 139 quickly and efficiently without requiring the use of additional coupling structures and/or methods, thereby significantly simplifying a method of manufacturing the corresponding electrical box assemblies 10, 110. Second, each of the clamping elements 40, 140 is able to be easily manufactured, such as by molding, due to the simplified construction thereof, which is devoid of complex shapes and/or moving parts. Third, the plate-like structure of the main body of each of the clamping elements 40, 140 in conjunction with the presence of the protuberances 50, 150 projecting outwardly from the corresponding main body results in each of the clamping elements 40, 140 cooperating with the surfaces forming each of the respective clamp openings 39, 139 to form a K-clamp-like structure. That is, the manner in which each of the protuberances 50, 150 extends away from the plane of the corresponding main body while also being constrained between opposing surfaces of the corresponding clamp opening 39, 139 results in the formation of a laterally extending axis (through the corresponding main body) about which the axially outward extending portion of the corresponding main body may flex relative to the constrained portion of the corresponding main body, thereby generating the necessary clamping effect when the axially outward extending portion is flexibly deformed and resiliently applying a force to a cord or cable extending thereby.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:
1. An electrical box comprising:
an enclosure having a bottom wall and a peripheral wall extending away from the bottom wall in an axial direction of the enclosure to define a cavity of the enclosure, a front opening of the enclosure providing access to the cavity thereof;

a retainer wall extending axially from the bottom wall and spaced from the peripheral wall in a radial inward direction of the enclosure; and a clamping element disposed in a clamp opening formed between the peripheral wall and the retainer wall with respect to a radial direction of the enclosure and held by a press fit, the clamping element applying a clamping force to an electrical cable extending through a gap formed between the peripheral wall and the clamping element, wherein the bottom wall, the peripheral wall, and the retainer wall cooperate with each other to form the clamp opening, wherein the clamping element is divided into an upper portion and a lower portion by a protuberance, wherein the lower portion of the clamping element is received entirely in the clamp opening by a press-fit and the upper portion extends outside of the clamp opening in a freely disposed position, and wherein the gap is formed between the upper portion of the clamping element and peripheral wall with respect to an entire width of the clamping element perpendicular to an axial direction of the enclosure.

2. The electrical box of claim 1, wherein the peripheral wall includes a window portion through which the electrical cable is passed before the clamping element applies the clamping force to the electrical cable when extending through the gap.

3. The electrical box of claim 2, wherein the electrical cable passes through a cable opening formed through the window portion.

4. The electrical box of claim 3, wherein the window portion is a knockout of the peripheral wall and the cable opening penetrates the knockout.

5. The electrical box of claim 3, wherein an axial outer end of the clamping element spaced apart distally from the bottom wall is positioned further from the bottom wall than the cable opening with respect to the axial direction of the enclosure to cause the electrical cable to extend axially away from the bottom wall before the clamping element applies the clamping force to the electrical cable when extending through the gap, wherein the electrical cable extends over the axial outer end of the clamping element.

6. The electrical box of claim 1, wherein the peripheral wall includes a sill wall projection and an axially outward portion disposed further from the bottom wall than the sill wall projection with respect to the axial direction of the enclosure, wherein the sill wall projection projects inwardly relative to the axially outward portion with respect to the inward direction of the enclosure.

7. The electrical box of claim 6, wherein the clamp opening is formed directly between the sill wall projection and the retainer wall, and wherein the clamp opening is a rectangular-cuboid shaped opening.

8. The electrical box of claim 7, wherein the clamp opening is formed directly between an axially extending surface of the sill wall projection and an axially extending surface of the retainer wall, wherein the axially extending surface of the sill wall projection is substantially planar and the axially extending surface of the retainer wall is substantially planar, and wherein the axially extending surface of the sill wall projection is arranged parallel to the axially extending surface of the retainer wall.

9. The electrical box of claim 6, wherein the gap is formed between the axially outward portion of the peripheral wall and the clamping element.

10. The electrical box of claim 9, wherein the axially outward portion of the peripheral wall is substantially planar and arranged substantially parallel to the axial direction of the enclosure, and wherein a surface of the clamping element facing towards the axially outward portion of the peripheral wall is substantially planar and arranged substantially parallel to the axially outward portion of the peripheral wall.

11. The electrical box of claim 1, wherein the clamping element includes a substantially planar and plate-like main body having an outward facing surface and an oppositely arranged inward facing surface, and wherein the protuberance protrudes inwardly from the inward facing surface of the main body, wherein the lower portion of the clamping element includes a first lateral leg and a second lateral leg defined by an indentation formed in an inner axial end of the clamping element between the first lateral leg and the second lateral leg of the clamping element.

12. The electrical box of claim 11, wherein the press fit includes the outward facing surface engaging the peripheral wall and the protuberance engaging the retainer wall within the clamp opening, wherein the protuberance extends radially inwardly in a direction perpendicular to the axial direction of the enclosure.

13. The electrical box of claim 12, wherein the clamping force is applied to the electrical cable by the upper portion of the clamping element.

14. The electrical box of claim 12, wherein the protuberance is divided laterally into a central portion, a first lateral portion, and a second lateral portion, wherein the protuberance protrudes from the inward facing surface a first distance along the central portion of the protuberance and wherein the protuberance protrudes from the inward facing surface a second distance along the first lateral portion and the second lateral portion of the protuberance of the clamping element, wherein the second distance is greater than the first distance.

15. The electrical box of claim 11, wherein the protuberance extends in lateral direction of the clamping element arranged transverse to each of the axial direction and the inward direction of the enclosure.

16. The electrical box of claim 1, wherein the clamping element is formed from a resiliently flexible material.

17. The electrical box of claim 16, wherein the clamping element is formed from a polymeric material.

18. The electrical box of claim 1, wherein the enclosure is formed from a non-metallic material.

* * * * *